United States Patent Office 3,067,239
Patented Dec. 4, 1962

3,067,239
PREPARATION OF MIXED PHENYL ESTERS OF ANHYDRIDE - FORMING POLYCARBOXYLIC ACIDS
Robert H. Mills, Webster Groves, Mo., assignor to Monsanto Chemical Company, St. Louis, Mo., a corporation of Delaware
No Drawing. Filed Apr. 27, 1959, Ser. No. 808,928
13 Claims. (Cl. 260—475)

This invention relates to a new method for producing mixed phenyl esters of polycarboxylic acids which form anhydrides by the reaction of said anhydrides, a phenol, a tertiary aliphatic amine and an organic halide.

By "mixed phenyl ester" is meant those compounds having at least one radical of the structure,

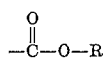

wherein R is a phenyl radical, and at least one radical of the structure,

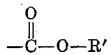

wherein R' is an alkyl radical, an aralkyl radical or an alkenyl radical.

Mixed phenyl esters of polycarboxylic acids and methods for their preparation from acid chlorides, as well as from acid anhydrides, are known. To make such esters starting with an acid anhydride, one procedure is to react an acid anhydride with an alkanol to produce a half ester; react the half ester with PCl$_5$ to make an acid chloride; and react a phenol with the acid chloride to produce the mixed ester. Such a procedure, however, is quite expensive due to the necessity of forming the acid chloride. If it is attempted to react an anhydride and a phenol to form a phenyl partial ester, and to thereafter further react said partial ester with an alkanol, the phenyl partial ester, being unstable, breaks down and essentially no mixed phenyl ester is produced.

It is an object of this invention to provide a method for producing mixed phenyl esters of polycarboxylic acids which form anhydrides and are free from olefinic unsaturation.

In its broadest aspects, the method of this invention involves the production of mixed phenyl esters of poly carboxylic acids by reacting (1) an anhydride of a polycarboxylic acid free from olefinic unsaturation with (2) a phenol and (3) a tertiary aliphatic amine to form an amine phenyl salt of said acid, and thereafter reacting said salt with (4) an organic halide of the structure, R'X, wherein R' is selected from aralkyl, alkyl and alkenyl radicals and X is selected from chlorine, bromine and iodine. A particular method of this invention involves heating reactants (1), (2), (3) and (4), as defined above, in substantially equimolar amounts.

The invention is further illustrated by the following non-limiting examples. Parts are parts by weight.

Example 1

To a suitable closed reaction vessel are charged about 74.1 parts of phthalic anhydride and about 39.5 parts of tert.-butyl-phenol. After heating the mixture to about 100° C., the addition of triethylamine is commenced. After about 27 parts of amine have been added, the addition of octyl chloride (1-chloro-octane) is begun. Over a period of about four hours, an additional 39.5 parts of triethylamine and 81.8 parts of octyl chloride are added while keeping the temperature in the range of about 115–136° C.

Thereafter the reaction mass is agitated for an additional twelve hours at a temperature in the range of 136–140° C. The reaction product, crude tert.-butylphenyl octyl phthalate, is then refined by two water washes, two basic washes, two water washes and drying. The refined product is then distilled under vacuum, after which there remain about 153.6 parts of tert.-butylphenyl octyl phthalate, a yield of about 75%, having a boiling range of 169–200° C. at 0.6–2.0 mm. of mercury and an $n_D^{25}$ of 1.5181.

In a manner similar to that of Example 1, other polycarboxylic anhydrides, phenols and organic halides can be utilized to produce various mixed phenyl esters, as shown, for example, in the following table:

| Ex. No. | Starting materials | Ester | Boiling point | $n_D^{25}$ |
|---|---|---|---|---|
| 2 | Phthalic anhydride, n-butyl bromide, phenol and triethylamine (TEA). | n-Butyl phenyl phthalate. | 169–175° C. at 0.2 mm. of mercury. | 1.5406 |
| 3 | Phthalic anhydride, ethyl iodide, phenol and TEA. | Ethyl phenyl phthalate. | 157–158° C. at 0.25 mm. | 1.5520 |
| 4 | Succinic anhydride, n-octyl chloride, phenol and TEA. | n-Octyl phenyl succinate. | 169–200° C. at 0.6 to 2.0 mm. | 1.4699 |
| 5 | Phthalic anhydride, n-octyl chloride, octylphenol and TEA. | Octylphenyl n-octyl phthalate. | 219–226° C. at 0.3 mm. | 1.5151 |
| 6 | Phthalic anhydride, benzyl chloride, bisphenol A and TEA. | Dibenzyl [isopropylidenebis (p-phenylene)] diphthalate. | (¹) | |
| 7 | Phthalic anhydride, n-octyl chloride, cresol and TEA. | n-Octyl cresyl phthalate. | 213–216° C. at 0.45 mm. | 1.5230 |
| 8 | Phthalic anhydride, benzyl chloride, cresol and TEA. | Benzyl cresyl phthalate. | 224–225° C. at 0.5 to 0.6 mm. | 1.5801 |
| 9 | Phthalic anhydride, amyl chloride, nonylphenol and TEA. | Amyl nonylphenyl phthalate. | 223–233° C. at 0.5 mm. | 1.5225 |
| 10 | Phthalic anhydride, dodecyl chloride, cresol and TEA. | Dodecyl cresyl phthalate. | 231–247° C. at 0.4 mm. | 1.5107 |
| 11 | Phthalic anhydride, 1-chlorohexadecane, phenol and TEA. | Hexadecyl phenyl phthalate. | (²) | |
| 12 | Phthalic anhydride, benzyl chloride, nonylphenol and TEA. | Benzyl nonylphenyl phthalate. | 235–270° C. at 0.8 mm. | 1.5544 |
| 13 | Phthalic anhydride, benzyl chloride, phenol and TEA. | Benzyl phenyl phthalate. | 217–219° C. at 0.3 mm. | 1.5860 |
| 14 | Phthalic anhydride, n-octyl chloride, phenol and tributylamine. | n-Octyl phenyl phthalate. | 207° C. at 0.35 mm. | 1.5222 |
| 15 | Phthalic anhydride, allyl chloride, phenol and TEA. | Allyl phenyl phthalate. | 163–167° C. at 0.25 mm. | 1.5530 |

¹ Very viscous liquid.
² Waxy semi-solid at room temperature.

The tertiary aliphatic amines suitable for use in this invention can be represented by the structure,

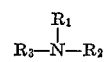

where R$_1$, R$_2$ and R$_3$ are like or unlike aliphatic organic radicals. Preferably, R$_1$, R$_2$ and R$_3$ have a total of 3 to 24 carbon atoms, and it is also preferred that R$_1$, R$_2$ and R$_3$ be alkyl radicals which together have a total of 3 to 24 carbon atoms. Non-limiting examples of such amines are trimethylamine, triethylamine, tri-n-propylamine, tri-isopropylamine, tri-n-butylamine, tri-isoamylamine, trihexylamine, triethanolamine, methyldiethylamine, dimethylethylamine, methyldiethanolamine, dimethylethanolamine, dimethylcyclohexylamine, dimethylhexylamine, diethylhexylamine, dimethyldecylamine, and the like.

The organic halide reactant of this invention can be represented by R'X, where R' is an aralkyl radical such as benzyl, phenylethyl, phenylhexyl, etc., or an alkyl radical such as methyl, ethyl, n-propyl, isopropyl, butyl, isobutyl, tert.-butyl, amyl, hexyl, dimethylbutyl, heptyl, tert.-octyl, n-octyl, 2-ethylhexyl, nonyl, decyl, undecyl, dodecyl, tridecyl, tetradecyl, pentadecyl, hexadecyl, heptadecyl, octadecyl, nondecyl, eicosyl, heneicosyl, docosyl, tricosyl and tetracosyl, or an alkenyl radical such as ethenyl, allyl, butenyl, isobutenyl, octenyl, decenyl, or a mixture of organic halides having such organic radical portions. Particularly suitable alkyl halide reactants are those obtained by monochlorinating alkane fractions obtained from petroleum. Examples of such alkanes are those obtained from petroleum fractions boiling at atmospheric pressure within the range of about 30° C. to about 300° C., such as a pentane cut from gasoline boiling from about 30° C. to about 40° C., a ligroin boiling from about 90° C. to about 120° C., a benzine boiling from about 120° C. to about 150° C., and a kerosene boiling from about 150° C. to about 235° C.

The polycarboxylic acid anhydrides suitable for use in the process of this invention are, as stated above, those polycarboxylic acid anhydrides which are free from olefinic unsaturation. Thus substituted, as well as unsubstituted, acid anhydrides are suitable in the process of this invention. Non-limiting examples of suitable anhydrides are phthalic, trimellitic, pyromellitic, succinic, glutaric and adipic; the halogenated derivatives thereof, e.g., a chlorophthalic anhydride and a chlorosuccinic anhydride; the alkyl-substituted anhydrides such as dodecyl succinic anhydride, particularly those dodecyl succinic anhydrides wherein the dodecyl radical is derived from propylene tetramer or butylene trimer; and anhydrides having nitro, ether or keto groups. As used herein, the term "polycarboxylic acid anhydride free from olefinic unsaturation" is intended to include the substituted derivatives such as those mentioned.

We have also found that, although a solvent may be employed for the process of this invention, it is preferred to conduct the reaction without a solvent in order to obtain the maximum yield of desired ester. Thus, for example, it is preferred to use a monohalo-alkane free from unhalogenated alkane, but, when commercial quantities of halo-alkane are utilized, it is not always possible to obtain completely monohalogenated alkane. In such a situation, unhalogenated alkane is considered a diluent which does not prohibit utilization of the method of this invention.

The phenyl portion of the mixed phenyl esters contemplated by this invention can be any phenyl radical free from amino, sulfonic acid and carboxylic acid groups, such as phenyl, cresyl, tert.-butylphenyl, di-tert.-butylphenyl, octylphenyl, tert.-octylphenyl, nonylphenyl, tert.-dodecylphenyl, etc., xylenyl, dihydroxyxylyl, xenyl and the like.

The mixed phenyl esters which can be produced by the method of this invention are useful as plasticizers for vinyl chloride resins.

The term "vinyl chloride resins" includes polyvinyl chloride and copolymers of vinyl chloride, such as copolymers of vinyl chloride with vinyl acetate, methyl methacrylate, diethyl maleate, dibutyl maleate, dibutyl fumarate, or vinylidene chloride, and particularly the copolymers containing at least 85% of combined vinyl chloride. Plastic compositions produced by plasticizing a vinyl chloride resin, using the mixed phenyl ester of this invention as the plasticizers, exhibit extremely low volatility, as measured by the percent plasticizer lost, and also are extremely resistant to hydrocarbon extraction.

A significant advantage of the mixed phenyl esters of this invention is that, whereas such compounds as diphenyl phthalate and dibenzyl phthalate are solids at room temperature, the mixed phenyl esters which can be made by the process of this invention, such as benzyl phenyl phthalate and benzyl cresyl phthalate, are generally liquids at room temperature. This significant difference in physical state makes such compounds particularly suitable as plasticizers.

Other modes of applying the principles of this invention will be apparent to those skilled in the art. Accordingly, while this invention has been described with reference to various specific examples and embodiments, it is understood that the invention is not limited to such examples and that it may be variously practiced within the scope of the following claims.

What is claimed is:

1. In a process for producing mixed phenyl esters of polycarboxylic acids which form anhydrides and which are free from olefinic unsaturation, the step comprising reacting (a) an anhydride of a polycarboxylic acid selected from the group consisting of benzene carboxylic acids and alkanedioic acids having up to about 10 carbon atoms including those anhydrides having substituents selected from the group consisting of halogen atoms, alkyl, nitro, ether and keto groups, (b) a phenol selected from the group consisting of phenol, alkyl-substituted phenol and hydroxy biphenyl, (c) a saturated tertiary aliphatic amine having 3 to 24 carbon atoms, and (d) an organic halide of the structure, R'X, wherein R' is selected from alkyl having up to 24 carbon atoms, phenylalkyl having up to 12 carbon atoms and alkenyl having up to 10 carbon atoms and X is selected from chlorine, bromine and iodine.

2. Claim 1 wherein reactants (a), (b), (c) and (d) are present in substantially equimolar amounts.

3. In a process for producing mixed phenyl esters of polycarboxylic acids which form anhydrides and which are free from olefinic unsaturation, the steps comprising (1) reacting a mixture of (a) an anhydride of a polycarboxylic acid selected from the group consisting of benzene carboxylic acids and alkanedioic acids having up to about 10 carbon atoms including those anhydrides having substituents selected from the group consisting of halogen atoms, alkyl, nitro, ether and keto groups, (b) a phenol selected from the group consisting of phenol, alkyl-substituted phenol and hydroxy biphenyl, and (c) a saturated tertiary aliphatic amine having 3 to 24 carbon atoms, and (2) thereafter reacting the reaction mixture from step (1) with (d) an organic halide of the structure R'X, wherein R' is selected from alkyl having up to 24 carbon atoms, phenylalkyl having up to 12 carbon atoms and alkenyl having up to 10 carbon atoms and X is selected from chlorine, bromine and iodine, the quantity of reactants (a), (b), (c) and (d) being substantially equimolar.

4. In a process for producing mixed phenyl esters of phthalic acid, the step comprising reacting substantially equimolar amounts (a) phthalic anhydride, (b) cresol, (c) triethylamine, and (d) a phenylalkyl chloride having up to 12 carbon atoms.

5. In a process for producing phenyl benzyl phthalate, the step comprising reacting a substantially equimolar mixture of phthalic anhydride, phenol, triethylamine and benzyl chloride.

6. In a process for producing phenyl octyl phthalate, the step comprising reacting a substantially equimolar mixture of phthalic anhydride, phenol, triethylamine and octyl chloride.

7. In a process for producing cresyl benzyl phthalate, the step comprising reacting a substantially equimolar mixture of phthalic anhydride, cresol, triethylamine and benzyl chloride.

8. In a process for producing mixed phenyl esters of phthalic acid, the step comprising reacting a substantially equimolar mixture of (a) phthalic anhydride, (b) alkyl-substituted phenol, (c) triethylamine, and (d) an alkyl chloride having up to 24 carbon atoms.

9. Claim 8 wherein the alkyl phenol is tert.-butyl phenol and the organic chloride is octyl chloride.

10. In a process for producing mixed phenyl esters of phthalic acid, the step comprising reacting substantially equimolar amounts of (a) phthalic anhydride, (b) phenol, (c) triethylamine, and (d) alkyl chloride having up to 24 carbon atoms.

11. In a process for producing mixed phenyl esters of phthalic acid, the step comprising reacting substantially equimolar amounts of (a) phthalic anhydride, (b) phenol, (c) triethylamine, and (d) phenylalkyl chloride having up to 12 carbon atoms.

12. In a process for producing mixed phenyl esters of phthalic acid, the step comprising reacting substantially equimolar amounts of (a) phthalic anhydride, (b) phenol, (c) triethylamine, and (d) alkenyl chloride having up to 10 carbon atoms.

13. In a process for producing mixed phenyl esters of succinic acid, the step comprising reacting substantially equimolar amounts of (a) succinic anhydride, (b) phenol, (c) triethylamine, and (d) alkyl chloride having up to 24 carbon atoms.

References Cited in the file of this patent

UNITED STATES PATENTS

| | | |
|---|---|---|
| 2,170,030 | Malm et al. | Aug. 23, 1939 |
| 2,730,513 | Balley et al. | Jan. 10, 1956 |
| 2,789,101 | Wilson | Apr. 16, 1957 |
| 2,862,959 | Patrick et al. | Dec. 2, 1958 |